Patented June 29, 1937

2,085,305

UNITED STATES PATENT OFFICE 2,085,305

ARSENOBENZENE-MONO-SULPHOXYLATES

Alfred Fehrle, Bad Soden-in-the-Taunus, Germany, Karl Streitwolf, deceased, late of Frankfort-on-the-Main, Germany, by Frieda Streitwolf, Frankfort-on-the-Main, Germany, administratrix, and Paul Fritzsche, Frankfort-on-the-Main, Germany, assignors to Winthrop Chemical Company, Inc., New York, N. Y., a corporation of New York No Drawing. Application February 25, 1935, Serial No. 8,212. In Germany March 10, 1934

5 Claims. (Cl. 260—15)

The present invention relates to arsenobenzene-monosulphoxylates.

In U. S. Patent application Serial No. 757,730 filed Dec. 15, 1934, there are described amino-arsenobenzene-monosulphoxylates containing at the same amino group two hydroxyalkyl radicals.

Now we have found that compounds of the following general formula:

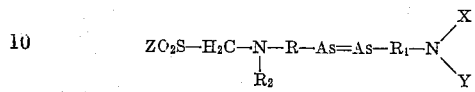

wherein R and R₁ stand for nuclei of the benzene series substituted by a hydroxy group, R₂ stands for an alkyl radical which may contain at least one hydroxy group, X and Y stand for alkyl radicals containing at least one hydroxy group, and Z stands for an alkali metal, have likewise valuable therapeutic properties and more particularly the compounds corresponding to the following general formula:

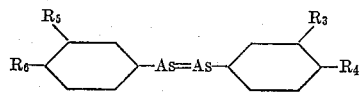

wherein R₃ stands for hydroxyl, R₄ for the group

X and Y being alkyl radicals containing at least one hydroxy group, or R₄ stands for hydroxyl and R₃ for the group

R₅ stands for hydroxyl, R₆ for the group

R₂ being an alkyl radical which may contain at least one hydroxy group and Z being an alkali metal, or R₆ stands for hydroxyl and R₅ for the group

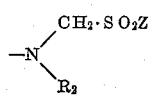

These compounds may be obtained by introducing into one of the amino groups of a diamino-arsenobenzene which may contain further substituents in the benzene nuclei, two hydroxyalkyl radicals by reaction with an alkylene oxide, and into the other amino group by treatment with an alkylating agent an alkyl radical or by means of an alkylene oxide a hydroxyalkyl radical and the formaldehydesulphoxylate radical; or by transforming aminobenzene-arsonic acids which may contain further substituents in the benzene nucleus, simultaneously by reduction into arseno-benzenes, and introducing at any stage of the process by means of an alkylene oxide simultaneously or in succession two hydroxyalkyl radicals into the amino group of one of the benzene arsonic acids and into the amino group of the other benzene-arsonic acid by treatment with an alkylating agent an alkyl radical or by means of an alkylene oxide a hydroxyalkyl radical and the formaldehydesulphoxylate radical. The various hydroxyalkyl radicals may be the same or not. Instead of the sodium there may be used other alkali metals, for instance, potassium. As alkylene oxide there may be employed ethylene-oxide, propylene-oxide, isobutylene-oxide, glycide, thus the radicals

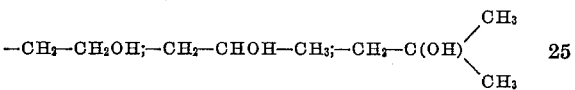

and $$CH_2—CHOH—CH_2OH$$

being situated at the nitrogen or the final products. Two different hydroxyalkyl radicals may also stand at the nitrogen. The same radicals above referred to may also stand at the amino group having the —CH₂·SO₂Z-radical. Furthermore, at this amino group there may, for instance, stand methyl, ethyl or propyl.

The following examples serve to illustrate the invention, but they are not intended to limit it thereto:

1. 13 grams of 3-hydroxy-4-(bis-dihydroxy-propyl)-amino-benzene-1-arsonic acid are well mixed with 8.44 grams of 3-methylamino-4-hydroxybenzene-1-arsonic acid (prepared as described in "Berichte der Deutschen Chemischen Gesellschaft", volume 45 (1912), page 2131) and 10.25 grams of potassium iodide in 250 cc. of hydrochloric acid of 10 per cent strength; the whole is filtered by suction with addition of animal charcoal and 23 cc. of hypophosphorous acid of 50 per cent strength are added. The liquid is decolorized, the temperature rising to about 30° C. When the reaction is complete the yellow solution is mixed, while stirring, with 250 cc. of ice-cold concentrated hydrochloric acid; the whole is filtered by suction in order to eliminate the inorganic salts which were precipitated, and the filtrate is precipitated in ethyl alcohol. The hydrochloride of 3-hydroxy-4-(bis-dihydroxypropyl)-amino-3'-methylamino-4'-hydroxyarsenobenzene separates in the form of a yellow precipitate which is filtered by suction and washed with ether. The compound is readily soluble in water and contains 18.77% of arsenic.

By dissolving 13.5 grams of the hydrochloride in aqueous methyl alcohol and mixing the solution, while stirring, at about 27° C. with a solution of 20 grams of formaldehyde sodium sulphoxylate in 40 cc. of water a precipitate is obtained which for the most part passes into solution on addition of sodium carbonate. The whole is filtered in order to eliminate the residue and the clear yellow filtrate is precipitated in ethyl alcohol. A yellow precipitate of 3-hydroxy-4-(bis-dihydroxypropyl)-amino-3'-methylamino-4'-hydroxyarsenobenzenemonosodiumsulphoxylate of the formula

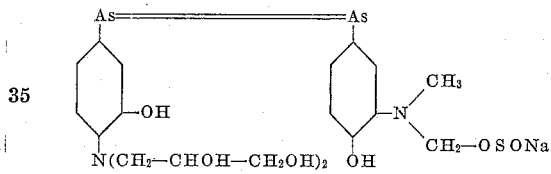

is obtained which is filtered by suction and washed with ether. The product is soluble in water and contains 19.3 per cent of arsenic.

The same compound is obtained by dissolving in 600 cc. of hydrochloric acid of 10 per cent strength a mixture of 23.3 grams of 3-hydroxy-4-aminobenzene-1-arsonic acid and 24.7 grams of 3-methylamino-4-hydroxybenzene-1-arsonic acid, decolorizing the solution with animal charcoal, reducing by addition of 80 cc. of hypophosphorous acid of 50 per cent strength and of a solution of 27 grams of potassium iodide in 27 cc. of water at about 45° C. so as to produce the hydrochloride of 3-hydroxy-4-amino-3'-methylamino-4'-hydroxyarsenobenzene and transforming the latter in known manner by means of formaldehydesulphoxylate into the corresponding monosulphoxylate. By causing two molecular proportions of glycide to act upon the aqueous solution of the sulphoxylate at an elevated temperature there is obtained after cooling and on addition of ethyl alcohol and ether a yellow precipitate of 3-hydroxy-4-(bis-dihydroxypropyl)-amino-3'-methylamino-4'-hydroxy-arsenobenzenesodiumsulphoxylate which has the same properties and the same pharmacological efficacy as the body made by the first method above described. The two compounds are therefore identical.

The 3-hydroxy-4-aminobenzene-1-arsonic acid used as starting material is condensed with an excess of glycide at a raised temperature so as to produce 3-hydroxy-4-(bis-dihydroxypropyl)-aminobenzene-1-arsonic acid; the latter is a colorless powder which is readily soluble in water and in methyl alcohol and contains 3.41 per cent of nitrogen.

2. 15.8 grams of 3-(bis-dihydroxypropyl)-amino-4-hydroxy-3'-amino-4'-hydroxyarsenobenzenemonosodiumsulphoxylate (obtainable according to Example 1 of U. S. Patent application Serial No. 757,730, filed Dec. 15, 1934) are heated in an aqueous solution to about 65° C. together with 1.48 grams of glycide; the clear yellow solution is precipitated in ethyl alcohol. The 3-(bis-dihydroxypropyl)-amino-4-hydroxy-3'-dihydroxypropyl-amino-4'-hydroxyarsenobenzenemonosodiumsulphoxylate of the formula:

separates in the form of a yellow precipitate which is filtered by suction and washed with ether. The compound is readily soluble in water and contains 18.94 per cent of arsenic.

The same product is obtained by dissolving 43.1 grams of 3.3'-diamino-4.4'-dihydroxyarsenobenzenedihydrochloride in aqueous methyl alcohol, causing a solution of 18.5 grams of formaldehydesulphoxylate in 37 cc. of water to act upon the solution so obtained for half an hour at about 30° C., dissolving the sulphoxylic acid which separates, with the aid of sodium carbonate and then heating with 23 grams of glycide. The solution so obtained is introduced, while stirring, into a mixture of ethyl alcohol and ether, whereupon a yellow precipitate of 3-(bis-dihydroxypropyl)-amino-4-hydroxy-3'-dihydroxypropylamino-4'-hydroxyarsenobenzenesodiumsulphoxylate is obtained which, if necessary, is purified by again dissolving it in water and precipitating it. The two final products produced by different methods have the same properties and the same pharmacological action which prove that the two compounds have the same constitution.

3. 24.7 grams of 3-methylamino-4-hydroxybenzene-1-arsonic acid and 34.3 grams of 3-hydroxy-4-(bis-hydroxyethyl)-aminobenzene-1-arsonic acid are dissolved in 400 cc. of hydrochloric acid of 10 per cent strength; the solution is decolorized with animal charcoal and mixed, while stirring, with 60 cc. of hypophosphorous acid of 50 per cent strength and a solution of 20 grams of potassium iodide in 20 cc. of water. The temperature rises to about 45° C., the solution which is at first brown assuming a light yellow coloration. After one hour's heating to 45° C. the whole is cooled and 400 cc. of ice-cold concentrated hydrochloric acid are added. The solution remains clear; it is introduced, while stirring, into ten times its weight of ethyl alcohol whereby a yellow precipitate of the hydrochloride of 3-hydroxy-4-(bis-hydroxyethyl)-amino-3'-methylamino-4'-hydroxyarsenobenzene is obtained which is filtered by suction and washed with ether.

14.5 grams of this hydrochloride are dissolved in aqueous methyl alcohol and the solution so obtained is heated to about 30° C. for about 20 minutes with a solution of 6 grams of formaldehyde sodium sulphoxylate in 12 cc. of water; the corresponding sulphoxylic acid precipitates which is again dissolved by addition of sodium carbonate. The solution is introduced, while stirring, into ethyl alcohol and a yellow precipitate of 3-hydroxy-4-(bis-hydroxyethyl)-amino-3'-methylamino-4'-hydroxyarsenobenzenesodiumsulphoxylate of the formula:

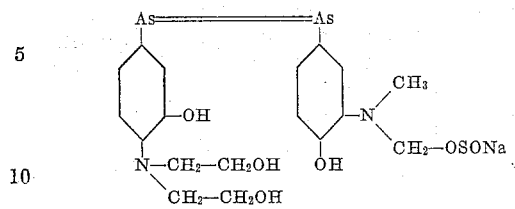

is obtained which is filtered by suction and washed with ether. The product is soluble in water and contains about 19 per cent of arsenic.

The same product is obtained by causing two molecular proportions of ethylene oxide to act at ordinary temperature upon an aqueous solution of 3-hydroxy-4-amino-3'-methylamino-4'-hydroxyarsenobenzenesodiumsulphoxylate (described in the third paragraph of Example 1) and precipitating the solution so obtained in a mixture of ethyl alcohol and ether. The two final products obtained in different ways show analogous chemical properties and the same pharmacological efficacy; they, therefore, have the same constitution.

The 3-hydroxy-4-(bis-hydroxyethyl)-aminobenzene-1-arsonic acid used as starting material is prepared by causing two molecular proportions of ethylene oxide to act upon an aqueous solution of the sodium salt of 3-hydroxy-4-aminobenzene-1-arsonic acid; it is an almost colorless powder which is readily soluble in water and contains 4.3 per cent of nitrogen.

4. 35.1 grams of 3-(dihydroxypropyl-hydroxyethyl)-amino-4-hydroxybenzene-1-arsonic acid and 24.7 grams of 3-methylamino-4-hydroxybenzene-1-arsonic acid are dissolved in 600 cc. of hydrochloric acid of 10 per cent strength; the solution is decolorized with animal charcoal and mixed, while stirring, with 80 cc. of hypophosphorous acid of 50 per cent strength and a solution of 30 grams of potassium iodide in 30 cc. of water, the temperature rising to about 40° C. When the reaction is complete 600 cc. of ice-cold concentrated hydrochloric acid are added; the clear liquid is introduced, while stirring, into 6.5 liters of ethyl alcohol. An orange precipitate of the hydrochloride of 3-(dihydroxypropyl-hydroxyethyl)-amino-4-hydroxy-3'-methylamino-4'-hydroxyarsenobenzene is produced which is filtered by suction and washed with ether.

By dissolving 40 grams of the hydrochloride in aqueous methyl alcohol and heating the solution to about 30° C. for 20 minutes with a solution of 28 grams of formaldehydesulphoxylate in 56 cc. of water, a dark yellow precipitate is obtained which is again dissolved on addition of sodium carbonate. The liquid so obtained is introduced, while stirring, into a mixture of ethyl alcohol and ether; a dark yellow precipitate of 3-(dihydroxypropyl-hydroxyethyl)-amino-4-hydroxy-3'-methylamino-4'-hydroxyarsenobenzensodiumsulphoxylate of the formula:

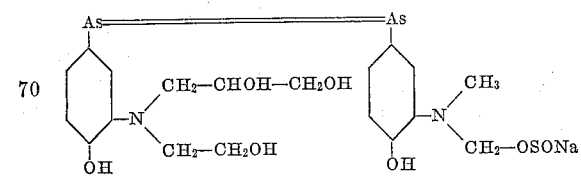

is obtained which is filtered by suction and washed with ether. The product contains 19.5 per cent of arsenic and is soluble in water.

The same compound is obtained by reducing molecular proportions of 3-amino-4-hydroxybenzene-1-arsonic acid and 3-methylamino-4-hydroxybenzene-1-arsonic acid in the usual manner by means of hypophosphorous acid and potassium iodide so as to produce the asymmetrical arseno compound and transforming the latter into the corresponding sulphoxylate by means of formaldehyde-sodiumsulphoxylate. By causing to act upon the aqueous solution of the sulphoxylate one molecular proportion of ethylene oxide, while cooling, and one molecular proportion of glycide, while heating, 3-(dihydroxypropyl-hydroxyethyl)-amino-4-hydroxy-3'-methylamino-4'-hydroxyarsenobenzenesodiumsulphoxylate is likewise obtained which is precipitated from its aqueous solution by addition of ethyl alcohol and ether. The two compounds have the same chemical properties and the same pharmacological efficacy; they are, therefore, identical.

The 3-(dihydroxypropyl-hydroxyethyl)-amino-4-hydroxybenzene-1-arsonic acid used as starting material is obtained by causing one molecular proportion of ethylene oxide and one molecular proportion of glycide to act upon 3-amino-4-hydroxy-benzene-1-arsonic acid. The almost colorless acid is very readily soluble in water and methyl alcohol and contains 3.8 per cent of nitrogen.

We claim:
1. The products of the following general formula:

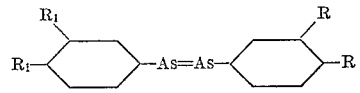

wherein one R stands for hydroxyl, the other R for the group

X and Y being alkyl radicals containing at least one hydroxy group, one $R_1$ stands for hydroxyl, the other $R_1$ for the group

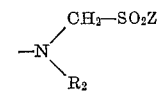

$R_2$ being a member of the group consisting of alkyl and hydroxyalkyl and Z being an alkali metal, said products being readily soluble in water and showing valuable therapeutic properties.

2. The products of the following general formula:

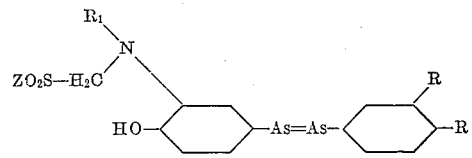

wherein $R_1$ stands for a member of the group consisting of alkyl and hydroxyalkyl, one R stands for hydroxyl, the other R for the group

X and Y being alkyl radicals containing at least one hydroxy group, and Z stands for an alkali metal, said products being readily soluble in water and showing valuable therapeutic properties.

3. The product of the following formula:

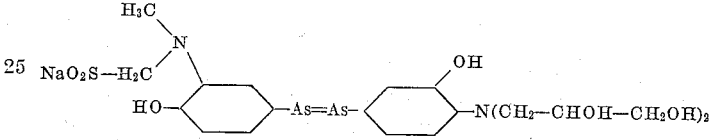

said product being readily soluble in water and showing valuable therapeutic properties.

4. The product of the following formula:

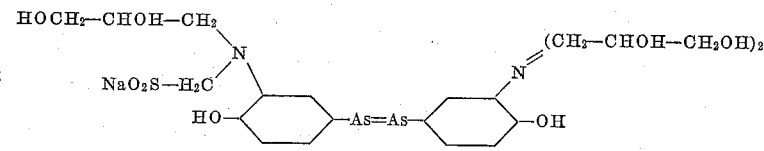

said product being readily soluble in water and showing valuable therapeutic properties.

5. The product of the following formula:

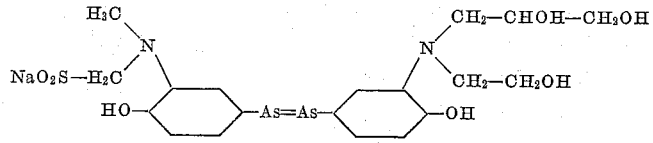

said product being readily soluble in water and showing valuable therapeutic properties.

ALFRED FEHRLE.
FRIEDA STREITWOLF,
*Administratrix of Karl Streitwolf, Deceased.*
PAUL FRITZSCHE.